United States Patent
Honmura et al.

(10) Patent No.: US 11,149,157 B2
(45) Date of Patent: Oct. 19, 2021

(54) PHOTOCURABLE RESIN COMPOSITION, INK AND COATING MATERIAL

(71) Applicant: Osaka Soda Co., Ltd., Osaka (JP)

(72) Inventors: Yuna Honmura, Osaka (JP); Satoshi Inoue, Osaka (JP); Shinichiro Ohashi, Osaka (JP); Katsutoshi Yokoyama, Osaka (JP)

(73) Assignee: Osaka Soda Co., Ltd., Osaka (JP)

( * ) Notice: Subject to any disclaimer, the term of this patent is extended or adjusted under 35 U.S.C. 154(b) by 0 days.

(21) Appl. No.: 16/323,697

(22) PCT Filed: Aug. 8, 2017

(86) PCT No.: PCT/JP2017/028766
§ 371 (c)(1),
(2) Date: Feb. 6, 2019

(87) PCT Pub. No.: WO2018/037912
PCT Pub. Date: Mar. 1, 2018

(65) Prior Publication Data
US 2019/0203061 A1   Jul. 4, 2019

(30) Foreign Application Priority Data

Aug. 22, 2016  (JP) .............................. JP2016-161767

(51) Int. Cl.
| | |
|---|---|
| *C09D 11/10* | (2014.01) |
| *C09D 11/101* | (2014.01) |
| *C08F 26/06* | (2006.01) |
| *C08F 2/50* | (2006.01) |
| *C08F 271/02* | (2006.01) |
| *C09D 139/04* | (2006.01) |
| *C09D 4/00* | (2006.01) |
| *C09D 11/107* | (2014.01) |
| *C09D 11/54* | (2014.01) |

(52) U.S. Cl.
CPC ............ *C09D 11/101* (2013.01); *C08F 2/50* (2013.01); *C08F 26/06* (2013.01); *C08F 271/02* (2013.01); *C09D 4/00* (2013.01); *C09D 11/107* (2013.01); *C09D 11/54* (2013.01); *C09D 139/04* (2013.01)

(58) Field of Classification Search
CPC .......... C09D 11/101; C09D 4/06; C09D 4/00; C09D 11/107; C09D 4/54; C09D 139/04; C08F 2/48; C08F 2/50; C08F 26/06; C08F 271/02; C08F 222/104
USPC ................. 522/151, 152, 173, 182
See application file for complete search history.

(56) References Cited

U.S. PATENT DOCUMENTS

| | | | |
|---|---|---|---|
| 3,576,789 A | 4/1971 | Kochhar | |
| 4,962,168 A | 10/1990 | Hiratsuna et al. | |
| 5,017,406 A * | 5/1991 | Lutz .................... | C08F 2/50 |
| | | | 427/515 |
| 5,275,878 A * | 1/1994 | Yamakawa et al. | |
| 5,284,807 A * | 2/1994 | Komori et al. | |
| 6,254,971 B1 | 7/2001 | Katayose et al. | |
| 6,342,273 B1 | 1/2002 | Handels et al. | |
| 6,524,769 B1 | 2/2003 | Ishii et al. | |

FOREIGN PATENT DOCUMENTS

| | | |
|---|---|---|
| CN | 1224567 | 7/1999 |
| CN | 104356967 | 2/2015 |
| EP | 0 170 923 | 12/1986 |
| EP | 0 957 664 | 11/1999 |
| GB | 2 089 818 | 6/1982 |
| JP | 52-004310 | 1/1977 |
| JP | 55-149940 | 11/1980 |
| JP | 56-043634 | 4/1981 |
| JP | 56-074245 | 6/1981 |
| JP | 56-161411 | 12/1981 |
| JP | 57-125205 | 8/1982 |
| JP | 3-033116 | 2/1991 |
| JP | 3-212460 | 9/1991 |
| JP | 4-161454 | 6/1992 |
| JP | 2002-099081 | 4/2002 |
| JP | 2005-068255 | 3/2005 |

(Continued)

*Primary Examiner* — Sanza L. McClendon
(74) *Attorney, Agent, or Firm* — Hamre, Schumann, Mueller & Larson, P.C.

(57) ABSTRACT

The present invention provides a photocurable resin composition containing a polymer (A) which has excellent adhesion to plastic substrates. The present invention relates to a photocurable resin composition that contains a polymer (A) produced by polymerization of a compound represented by the following formula [I]:

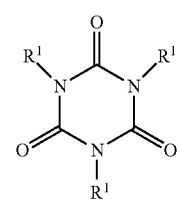

[I]

wherein each $R^1$ may be the same or different and represents a hydrogen atom, a C1-C5 alkyl group, a glycidyl group, or the group —$CH_2$—$CR^3$=$CHR^2$ wherein $R^2$ and $R^3$ each represent H or $CH_3$, provided that at least one $R^1$ is the group —$CH_2$—$CR^3$=$CHR^2$.

1 Claim, No Drawings

(56) References Cited

FOREIGN PATENT DOCUMENTS

| JP | 2012-144605 | 8/2012 |
|---|---|---|
| WO | 2006/090540 | 8/2006 |
| WO | 2016/201076 | 12/2016 |

* cited by examiner

PHOTOCURABLE RESIN COMPOSITION, INK AND COATING MATERIAL

TECHNICAL FIELD

The present invention relates to a photocurable resin composition that contains a polymer (A) produced by polymerization of a compound of formula [I], and also relates to an ink and a coating material each including the resin composition. Specifically, the present invention relates to a photocurable resin composition having excellent adhesion to plastic substrates.

BACKGROUND ART

Various resin compositions which can be cured by light (e.g. ultraviolet rays) have been used in inks, coating materials, adhesives, photoresists, and other applications. For example, UV curable printing inks are highly valued because, e.g., they have a high cure rate so that they can be cured in a short time; they are environmentally friendly due to no use of solvents; and they can save resources and energy. Therefore, they are increasingly widely used in practice.

Among such resin compositions, those containing diallyl phthalate resins derived from diallyl phthalate (diallyl orthophthalate, diallyl isophthalate, or diallyl terephthalate) are used as UV offset inks for paper.

However, in offset ink applications, the use of diallyl phthalate resins is known to lead to insufficient adhesion to plastic substrates (see, for example, Patent Literature 1). Moreover, Patent Literature 2 discloses a UV curable inkjet ink composition for non-absorbable materials which contains a pigment, a photopolymerization initiator, and a UV curable resin that includes a tri- or higher functional allyl group containing a triazine ring, a polyester acrylate, and a (meth)acrylate. However, this composition is for use in inkjet printing and thus poor in adhesion to plastic substrates and drying properties.

As products of various types of plastic materials, including polyethylene terephthalate (PET) and polypropylene (PP), have been commercially available in recent years, there is a need to improve adhesion to plastic substrates with which diallyl phthalate resins have problems.

CITATION LIST

Patent Literature

Patent Literature 1: JP S52-4310 A
Patent Literature 2: JP 2005-68255 A

SUMMARY OF INVENTION

Technical Problem

The present invention aims to provide a photocurable resin composition containing a polymer (A) which has excellent adhesion to plastic substrates.

Solution to Problem

In arriving at the present invention, it has been found as a result of extensive studies that a photocurable resin composition which contains a polymer (A) produced by polymerization of a compound of a specific structure has excellent adhesion to plastic substrates.

Specifically, the photocurable resin composition of the present invention contains a polymer (A) produced by polymerization of a compound represented by the following formula [I]:

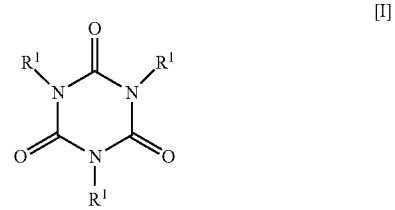

wherein each $R^1$ may be the same or different and represents a hydrogen atom, a C1-C5 alkyl group, a glycidyl group, or the group $-CH_2-CR^3=CHR^2$ wherein $R^2$ and $R^3$ each represent H or $CH_3$, provided that at least one $R^1$ is the group $-CH_2-CR^3=CHR^2$.

A photocurable resin composition which contains a polymer (A) produced by polymerization of a compound of formula [I] provides excellent adhesion to plastic substrates and excellent drying properties.

Moreover, since the photocurable resin composition has excellent adhesion particularly to polypropylene (PP) resins, the composition is suitable as a component of inks or coating materials for PP resins, to which conventional diallyl phthalate resin compositions are difficult to closely adhere.

The photocurable resin composition of the present invention preferably further contains an ethylenically unsaturated compound (B). The photocurable resin composition containing an ethylenically unsaturated compound has improved drying properties and can also be controlled to have a viscosity appropriate for printing, thus providing excellent coating workability.

The photocurable resin composition of the present invention preferably further contains a photopolymerization initiator. The photocurable resin composition containing a photopolymerization initiator can be smoothly polymerized by exposure to light to form a cured product in a short time.

The ink of the present invention includes the photocurable resin composition of the present invention.

The ink is suitable as an ink for printing on plastic substrates, particularly on PP resin substrates such as sheets or films.

The coating material of the present invention includes the photocurable resin composition of the present invention.

The coating material is suitable as a coating material for painting on plastic substrates, particularly on PP resin substrates such as sheets or films.

The coating material of the present invention is also preferably an overprint varnish.

ADVANTAGEOUS EFFECTS OF INVENTION

The present invention provides a photocurable resin composition that has excellent adhesion to synthetic polymer substrates, particularly plastic substrates, when it is used as a component of inks, coating materials, adhesives, or photoresists.

DESCRIPTION OF EMBODIMENTS

The present invention will be described in detail below.

Polymer (A)

The photocurable resin composition of the present invention contains a polymer (A) produced by polymerization of a compound represented by the formula [I] below.

The reason why the incorporation of the polymer (A) according to the present invention provides excellent adhesion to synthetic polymer substrates, particularly plastic substrates, is not clear, but can probably be explained as follows.

The polymer (A) produced by polymerization of a compound represented by the formula [I] below contains successive structures derived from an isocyanurate ring (ring structure (isocyanate trimer) in formula [I]) which seem to provide excellent adhesion to synthetic polymer substrates, particularly plastic substrates.

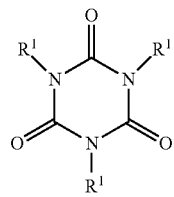

[I]

In formula [I], each $R^1$ may be the same or different and represents a hydrogen atom, a C1-C5 (preferably C1-C3) alkyl group, a glycidyl group, or the group —$CH_2$—$CR^3$=$CHR^2$ wherein $R^2$ and $R^3$ each represent H or $CH_3$, provided that at least one (preferably two, more preferably three) $R^1$ is the group —$CH_2$—$CR^3$=$CHR^2$.

As described, at least one of $R^1$ groups is —$CH_2$—$CR^3$=$CHR^2$, preferably two of them are —$CH_2$—$CR^3$=$CHR^2$ groups, and more preferably three of them are —$CH_2$—$CR^3$=$CHR^2$ groups. A larger number of —$CH_2$—$CR^3$=$CHR^2$ groups leads to better reactivity which can easily result in a higher molecular weight polymer.

$R^2$ and $R^3$ are each preferably H (hydrogen atom), and more preferably both are H (hydrogen atom).

Examples of the alkyl group as $R^1$ in formula [I] include methyl, ethyl, propyl, isopropyl, butyl, isobutyl, sec-butyl, tert-butyl, and pentyl groups. Preferred among these are methyl, ethyl, propyl, and isopropyl groups, with a methyl or ethyl group being more preferred.

Specific examples of the compound having a structure of formula [I] include triallyl isocyanurate, diallyl monoglycidyl isocyanurate, diallyl monomethyl isocyanurate, diallyl monoethyl isocyanurate, diallyl monopropyl isocyanurate, trimethallyl isocyanurate, diallyl isocyanurate, monoallyl dimethyl isocyanurate, monoallyl diethyl isocyanurate, monoallyl dipropyl isocyanurate, monoallyl diglycidyl isocyanurate, monoallyl monoethyl monomethyl isocyanurate, monoallyl isocyanurate, monoallyl dimethallyl isocyanurate, and monoallyl monomethallyl monomethyl isocyanurate. Among these, triallyl isocyanurate, diallyl monoglycidyl isocyanurate, diallyl monomethyl isocyanurate, and diallyl isocyanurate are preferred, with triallyl isocyanurate, diallyl monomethyl isocyanurate, and diallyl isocyanurate being more preferred, with triallyl isocyanurate being particularly preferred.

A polymer (A) produced by polymerization of the compound of formula [I] may be used in the photocurable resin composition. Further, a polymer produced by copolymerizing the compound of formula [I] with another polymerizable compound may be used in the photocurable resin composition. Examples of the copolymerizable compound include acrylic acid esters such as methyl acrylate and butyl acrylate; aliphatic or aromatic carboxylic acid vinyl esters such as vinyl acetate, vinyl laurate, and vinyl benzoate; vinyls such as vinyl chloride and vinyl bromide; vinylidenes such as vinylidene chloride and vinylidene bromide; vinyl alkyl ethers such as methyl vinyl ether and butyl vinyl ether; allyl ethers such as trimethylolpropane diallyl ether and pentaerythritol triallyl ether; aliphatic or aromatic carboxylic acid allyl esters such as allyl acetate and allyl benzoate; and polybasic acid allyl esters such as diallyl terephthalate and triallyl citrate. The content of the comonomer component in the polymer (A) may be 2 to 50% by weight, preferably 2 to 20% by weight.

In order to obtain the specific exemplary compounds of formula [I], for example, conventional polymerization methods may be used to synthesize them, or commercial products may be used.

The compound of formula [I] may be polymerized by any method, including conventional polymerization reactions. An appropriate polymerization initiator may optionally be added in such a polymerization reaction. The use of a polymerization initiator may allow for production of a higher molecular weight polymer (A) in a short period of time.

Examples of the polymerization initiator used in the polymerization reaction of the compound of formula [I] include azo initiators such as azobisisobutyronitrile and dimethyl 2,2'-azobisisobutyrate; peroxide initiators such as ketone peroxides, peroxy ketals, hydroperoxides, dialkyl peroxides, diacyl peroxides, peroxy dicarbonates, peroxy esters, and benzoyl peroxide; and photopolymerization initiators, including: acetophenone, initiators such as 2-methyl-1-[4-(methylthio)phenyl]-2-morpholinopropan-1-one and 1-hydroxycyclohexyl phenyl ketone; benzoin initiators such as benzoin and benzoin ethyl ether; benzophenone initiators such as benzophenone; phosphorus initiators such as acylphosphine oxide; sulfur initiators such as thioxanthone; and benzil initiators such as benzil and 9,10-phenanthrenequinone.

The amount of the polymerization initiator per 100 parts by weight of the compound of formula [I] as a monomer is preferably 5.0 parts by weight or less, more preferably 3.0 parts by weight or less, and particularly preferably in the range of 0.001 to 3.0 parts by weight.

The reaction temperature during the polymerization is preferably 60 to 240° C., for example 80 to 220° C. The reaction time is preferably 0.1 to 100 hours, for example 1 to 30 hours.

The compound of formula [I] may be polymerized as described above or by other methods to produce a polymer (A) having a monomer unit derived from the compound of formula [I].

The amount of the monomer unit derived from the compound of formula [I] based on 100% by weight of the polymer (A) is preferably 20% by weight or more, more preferably 50% by weight or more, still more preferably 80% by weight or more, particularly preferably 98% by weight or more, and may be 100% by weight.

The polymer (A) preferably has a weight average molecular weight (Mw) of 250,000 or less, more preferably 200,000 or less. The weight average molecular weight of the polymer (A) is also preferably 2,000 or more, more preferably 5,000 or more.

Further, the weight average molecular weight of the polymer (A) is still more preferably 10,000 to 150,000, particularly preferably 20,000 to 140,000.

The polymer (A) preferably has a molecular weight distribution (weight average molecular weight (Mw)/number average molecular weight (Mn)) of 1.5 to 10.0, more preferably 3.0 to 7.5.

As used herein, the weight average molecular weight (Mw) and number average molecular weight (Mn) of the polymer (A) are determined as described in EXAMPLES.

The amount of the polymer (A) in the photocurable resin composition of the present invention is preferably 1 to 50% by weight, more preferably 1 to 40% by weight, still more preferably 1 to 30% by weight of the total amount of the photocurable resin composition. The lower limit of the amount is particularly preferably 1% by weight and may be 5% by weight. When the amount of the polymer (A) exceeds 50% by weight, the polymer may have a lower solubility in an ethylenically unsaturated compound (B) and may also provide a higher viscosity leading to lower handleability. When the amount of the polymer (A) is less than 1% by weight, the resulting photocurable resin composition may fail to provide sufficient drying properties or adhesion.

Ethylenically Unsaturated Compound B

The photocurable resin composition of the present invention preferably contains an ethylenically unsaturated compound (B) that can be cured by exposure to light. The ethylenically unsaturated compound (B) preferably has 1 to 20, more preferably 1 to 10, still more preferably 2 to 6 carbon-carbon double bonds. The ethylenically unsaturated compound (B) may be, for example, a (meth)acrylic acid ester compound, a (meth)allyl compound, or a vinyl compound. The ethylenically unsaturated compound may also be a mixture of two or more compounds.

Examples of the (meth)acrylic acid ester compound include (meth)acrylic acid ester compounds of alcohols such as pentaerythritol, dipentaerythritol, trimethylolpropane, ditrimethylolpropane, neopentyl glycol, 1,6-hexanediol, glycerol, polyethylene glycol, or polypropylene glycol, and alkylene oxide (e.g. ethylene oxide or propylene oxide) adducts of the foregoing (meth)acrylic acid ester compounds; (meth)acrylic acid ester compounds of alkylene oxide (e.g. ethylene oxide or propylene oxide) adducts of bisphenols such as bisphenol A or bisphenol F; (meth)acrylic acid ester compounds such as epoxy (meth)acrylate, urethane (meth)acrylate, and alkyd (meth)acrylate; and (meth)acrylic acid ester compounds such as epoxidized soybean oil acrylate. Preferred are (meth)acrylic acid ester compounds of alcohols such as pentaerythritol, dipentaerythritol, trimethylolpropane, ditrimethylolpropane, neopentyl glycol, 1,6-hexanediol, glycerol, polyethylene glycol, or polypropylene glycol, and alkylene oxide (e.g. ethylene oxide or propylene oxide) adducts of the foregoing (meth)acrylic acid ester compounds. More preferred are (meth)acrylic acid ester compounds of alcohols such as pentaerythritol, dipentaerythritol, trimethylolpropane, or ditrimethylolpropane, and alkylene oxide (e.g. ethylene oxide or propylene oxide) adducts of the foregoing (meth)acrylic acid ester compounds.

Examples of the (meth)allyl compound include di(meth)allyl phthalate.

Examples of the vinyl compound include styrene, divinylbenzene, N-vinylpyrrolidone, and vinyl acetate.

In view of compatibility with the polymer (A) and curability in photo-curing, ditrimethylolpropane tetraacrylate and trimethylolpropane triacrylate, and alkylene oxide (e.g. ethylene oxide or propylene oxide) adducts of the foregoing are preferred among these.

The amount of the ethylenically unsaturated compound (B) in the photocurable resin composition of the present invention is preferably 50 to 1,200 parts by weight, more preferably 50 to 1,000 parts by weight, still more preferably 100 to 900 parts by weight, per 100 parts by weight of the polymer (A) in the photocurable resin composition.

The ratio of the polymer (A) to the ethylenically unsaturated compound (B) (polymer:ethylenically unsaturated compound) in the photocurable resin composition of the preset invention may be in the range of 5:95 to 95:5, preferably of 10:90 to 90:10, more preferably of 10:90 to 70:30, still more preferably of 10:90 to 50:50 by weight. When the ratio falls within the range indicated above, sufficient adhesion to plastic substrates can be easily provided.

Other Additives

The photocurable resin composition of the present invention may contain a polymerization initiator, particularly preferably a photopolymerization initiator. Examples of the photopolymerization initiator used in the photocurable resin composition include acetophenone initiators such as 2-methyl-1-[4-(methylthio)phenyl]-2-morpholinopropan-1-one and 1-hydroxycyclohexyl phenyl ketone; benzoin initiators such as benzoin and benzoin ethyl ether; benzophenone initiators such as benzophenone; phosphorus initiators such as acylphosphine oxide; sulfur initiators such as thioxanthone; and benzil initiators such as benzil and 9,10-phenanthrenequinone.

The amount of the photopolymerization initiator in the photocurable resin composition is preferably in the range of 0.1 to 15% by weight, more preferably 0.5 to 12% by weight, still more preferably 1 to 10% by weight of the total photocurable resin composition.

A photoinitiation aid (e.g. an amine photoinitiation aid such as triethanolamine) may be used together in the photocurable resin composition.

The amount of the photoinitiation aid is preferably in the range of 0.1 to 5% by weight, more preferably 0.5 to 3% by weight of the total photocurable resin composition.

The photocurable resin composition of the present invention may contain various additives depending on the purpose, and examples of such additives include stabilizers such as polymerization inhibitors (e.g. hydroquinone, methoquinone, methyl hydroquinone), coloring agents such as pigments (e.g. cyanine blue, disazo yellow, carmine 6b, lake red C, carbon black, titanium white), fillers, and viscosity modifiers. The amount of the stabilizer in the photocurable resin composition is preferably in the range of 0.01 to 2% by weight, more preferably 0.1 to 1% by weight of the total photocurable resin composition.

The amount of the coloring agent is preferably in the range of 1 to 50% by weight, more preferably 1 to 45% by weight of the total photocurable resin composition.

The photocurable resin composition of the present invention may be prepared by mixing a polymer (A) optionally with an ethylenically unsaturated compound (B) and a photopolymerization initiator, a photoinitiation aid, and additives (e.g. stabilizers, pigments). The photocurable resin composition of the present invention is curable by exposure to light. The light used for curing is usually ultraviolet rays.

The curing reaction of the photocurable resin composition may be performed using any curing apparatus under any curing conditions, and any conventional methods for photocuring reactions can be used.

The photocurable resin composition of the present invention can be used in any application. It can be used in various technical fields, such as inks (e.g. printing inks such as photocurable lithographic inks, silk screen inks, and gravure inks), coating materials (e.g. coating materials for paper, plastics, metals, wood, or other substrates, such as overprint varnishes), adhesives, and photoresists.

The ink of the present invention encompasses any ink that includes the photocurable resin composition of the present invention. The coating material of the present invention encompasses any coating material that includes the photocurable resin composition of the present invention. The coating material of the present invention is preferably an overprint varnish.

For example, the ink may typically be prepared as follows. A polymer (A) and additives such as a stabilizer may be dissolved in an ethylenically unsaturated compound (B) with stirring at 60 to 100° C. to prepare a varnish, which may then be combined with a pigment, a photopolymerization initiator, and other additives with stirring in a butterfly mixer, followed by milling using, for example, a three-roll mill to obtain an ink.

An overprint varnish may be prepared in the same manner as described for the ink but using no pigment.

EXAMPLES

The present invention is described in greater detail below referring to, but not limited to, examples.

Determination of weight average molecular weight (Mw) and molecular weight distribution (Mw/Mn) of polymer (A)

The weight average molecular weight (Mw) and the molecular weight distribution (Mw/Mn) were determined by GPC. The Mw and Mn values are relative to polystyrene standards.
Column: two Shodex LF-804 columns connected in series
Flow rate: 1.0 mL/min
Temperature: 40° C.
Detection: RID-20A Samples: Measurement Samples Prepared by Dissolving 30 mg of a Sample in 3 mL of Tetrahydrofuran Production Example 1: Synthesis of Triallyl Isocyanurate Polymer 1

To a 3 L separable flask were added 600 g of triallyl isocyanurate and then 15 g of benzoyl peroxide, followed by stirring with heat at 80° C. After one hour reaction, the reaction mixture was cooled to room temperature (25° C.). After the cooling, methanol was added to the flask to precipitate a polymer. The polymer was dried under reduced pressure at 40° C. for 16 hours to give a dried polymer (amount produced: 73 g, yield: 12%, Mw=53,000, Mw/Mn=3.3). The obtained polymer was used as polymer 1 in Examples 1 and 4 to 6.

Production Example 2: Synthesis of Triallyl Isocyanurate Polymer 2

A polymer was synthesized as in Production Example 1, except that the reaction time was 1.25 hours (amount produced: 84 g, yield: 14%, Mw=94,000, Mw/Mn=5.3). The obtained polymer was used as polymer 2 in Example 2.

Production Example 3: Synthesis of Triallyl Isocyanurate Polymer 3

A polymer was synthesized as in Production Example 1, except that the reaction time was 1.5 hours (amount produced: 94 g, yield: 16%, Mw=126,000, Mw/Mn=6.9). The obtained polymer was used as polymer 3 in Example 3.

Examples 1 to 6 and Comparative Examples 1 and 2

Photocurable resin compositions with the formulations shown in Table 1 were prepared and evaluated for properties.

TABLE 1

| Polymer or DAP resin | Ex. 1 Polymer 1 23 | Ex. 2 Polymer 2 23 | Ex. 3 Polymer 3 23 | Ex. 4 Polymer 1 10 | Ex. 5 Polymer 1 20 | Ex. 6 Polymer 1 30 | Comp. Ex. 1 DAP resin 28 | Comp. Ex. 2 |
|---|---|---|---|---|---|---|---|---|
| Triallyl isocyanurate (monomer) | | | | | | | | 5 |
| DTMPTA | 77 | 77 | 77 | 90 | 80 | 70 | 72 | 95 |
| Irgacure907 | 5 | 5 | 5 | 5 | 5 | 5 | 5 | 5 |
| Irganox1076 | 0.3 | 0.3 | 0.3 | 0.3 | 0.3 | 0.3 | 0.3 | 0.3 |

The components other than polymers 1 to 3 listed in Table 1 are described below.

It should be noted that the formulation amounts in Table 1 are in parts by weight.

DAP resin: DAISO DAP A (diallyl phthalate resin) available from Osaka Soda Co., Ltd.

Triallyl isocyanurate (monomer)

DTMPTA: SR355, ditrimethylolpropane tetraacrylate, available from Sartomer

Irgacure 907: 2-methyl-1-[4-(methylthio)phenyl]-2-morpholinopropan-1-one available from BASF Japan Irganox 1076: octadecyl-3-(3,5-di-t-butyl-4-hydroxyphenyl) propionate available from BASF Japan 1) Evaluation of Solubility of Photocurable Resin Composition Polymer 1, 2, or 3 prepared in each production example, DAP resin, or triallyl isocyanurate (monomer), the ethylenic compound, and the polymerization initiators in the formulation amounts indicated in Table 1 were combined and mixed with heating to prepare a photocurable resin composition. The compositions prepared as above were cooled to room temperature (25° C.) and then left overnight. Then, the appearance of the compositions was observed for transparency to determine the solubility. The compositions were rated as "Good" if they still had a transparent appearance after cooling, and "Poor" if they had a cloudy appearance. Table 2 shows the results.

2) Testing for Drying Properties

The prepared photocurable resin compositions were coated on a plastic film (polypropylene substrate, highly transparent cast PP sheet available from Tatsuta Chemical Co., Ltd., trade name: High P Crystal ST-500, thickness: 0.3 mm) using an RI tester and then cured using a metal halide lamp with an output of 120 W/cm (distance to lamp: 11 cm, conveyor speed: 50 m/min). The UV curing apparatus used was a conveyor-type UV curing apparatus available from Eye Graphics Co., Ltd. Curing passes were applied until the coating reached a state (tack-free state) in which no fingerprint was left on its surface when touched with a finger. The drying properties were evaluated based on the number of passes. Table 2 shows the results.

3) Testing for Adhesion

The prepared photocurable resin compositions were coated and cured on a plastic film in the same manner as in Testing for drying properties. An 18 mm-wide strip of Cellotape (registered trademark) (Nichiban Co., Ltd., product No. LP-18, adhesive force: 4.01 N/10 mm) was attached to the coating. After strong rubbing with a thumb ten times, the Cellotape (registered trademark) strip was slowly removed straight up. The photocurable resin compositions were rated as "Good" if they were not completely peeled, and "Poor" if they were completely peeled. Table 2 shows the results.

TABLE 2

| | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Solubility | Good | Good | Good | Good | Good | Good | Good | Good |
| Drying properties (number) | 2 | 2 | 2 | 2 | 2 | 2 | 2 | 3 |
| Adhesion (PP sheet) | Good | Good | Good | Good | Good | Good | Poor | Poor |

As shown in Examples 1 to 6, photocurable resin compositions prepared using polymer 1 to 3 produced by polymerization of a compound of formula [I] had drying properties comparable to a photocurable resin composition prepared using DAP resin as in Comparative Example 1. These compositions also exhibited excellent adhesion to a polypropylene sheet to which the photocurable resin compositions of Comparative Examples 1 and 2 prepared using DAP resin and triallyl isocyanurate (monomer), respectively, were difficult to closely adhere.

INDUSTRIAL APPLICABILITY

The photocurable resin composition of the present invention can be used in inks (e.g. offset inks), coating materials, adhesives, photoresists, and other applications for plastic substrates.

The invention claimed is:

1. An ink, comprising a photocurable resin composition, comprising
a polymer (A) produced by polymerization of a compound represented by the following formula [I]:

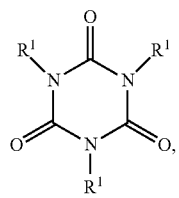

wherein each $R^1$ may be the same or different and represents a hydrogen atom, a C1-C5 alkyl group, a glycidyl group, or the group $-CH_2-CR^3=CHR^2$, wherein $R^2$ and $R^3$ each represent H or CH3, provided that at least one $R^1$ is the group $-CH_2-CR^3=CHR^2$.

* * * * *